2 Sheets—Sheet 1.
S. D. LOCKE.
Hop-Picking Machine.
No. 203,351. Patented May 7, 1878.
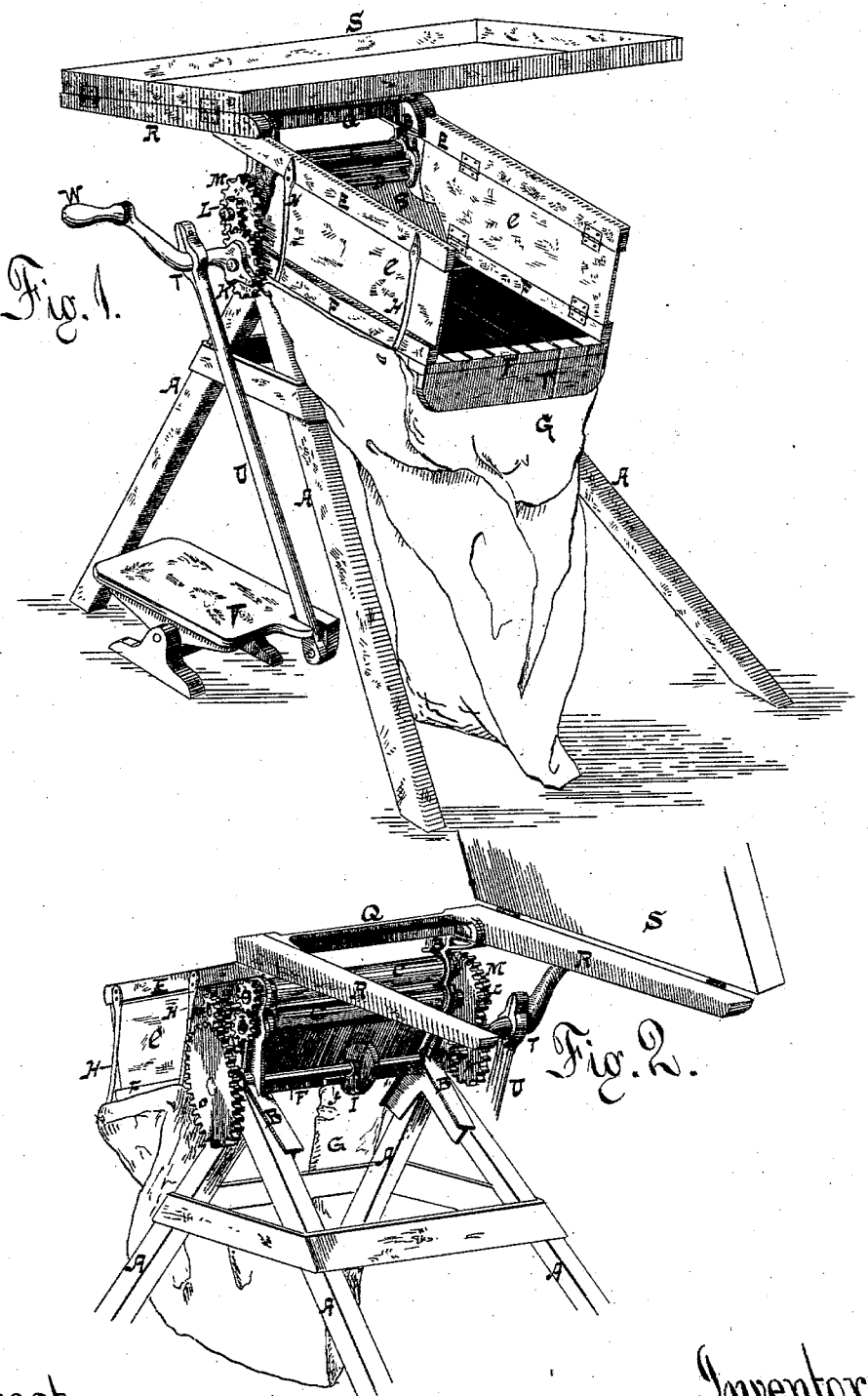
Attest.
A. H. Smith
A. B. Smith
Inventor.
S. D. Locke
By his Atty R. D. O. Smith

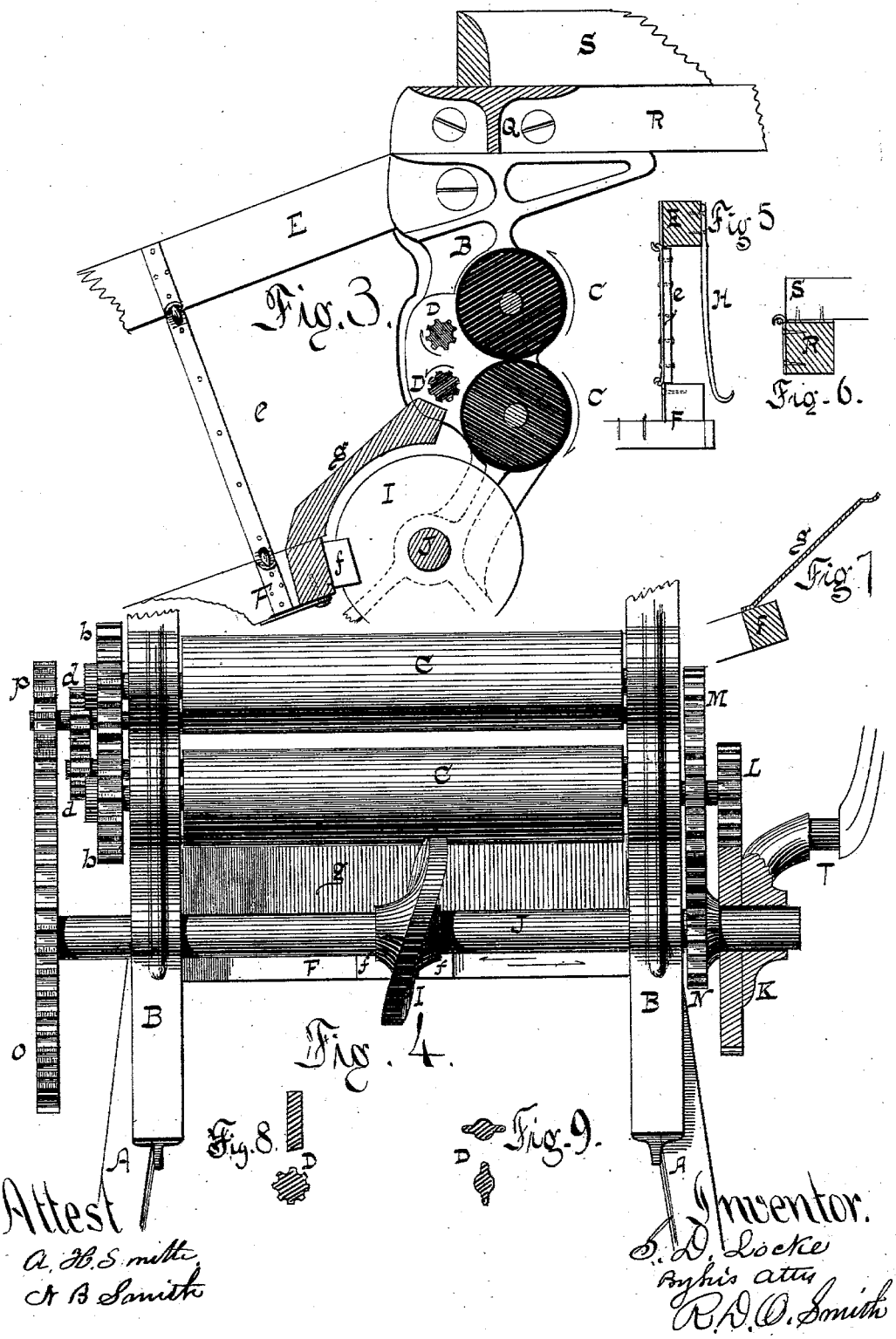

UNITED STATES PATENT OFFICE.

SYLVANUS D. LOCKE, OF HOOSICK FALLS, NEW YORK.

IMPROVEMENT IN HOP-PICKING MACHINES.

Specification forming part of Letters Patent No. 203,351, dated May 7, 1878; application filed April 8, 1878.

*To all whom it may concern:*

Be it known that I, SYLVANUS D. LOCKE, of Hoosick Falls, in the county of Rensselaer and State of New York, have invented new and useful Improvements on the Hop-Picking Machine, of which the following is a full and clear description:

The harvesting of the hop crop requires to be completed within a few days, and it occurs at a season when other harvesting operations are also necessarily in progress. It is a comparatively slow and tedious operation, and gives occupation to a large number of hands, whose lodgment and board have usually to be provided for by the proprietor. The gathering of a large crop therefore involves a great trouble and expense. To accomplish this work by mechanical means is therefore greatly desired.

The various parts of my invention consist, first, in fluted or corrugated or ribbed picker-rolls, so as to more effectually separate the hops from the vines; second, in a sieved or perforated receptacle or separator placed in front of picker-rollers, which revolve in front of and in an opposite direction to the feeding-rolls, so that the leaves and the bunches or branches of hops torn from the vines by the picker may be separated from the hops, substantially as set forth; third, in a fixed frame supporting the operating parts and a detachable retaining sack or receiver; fourth, in a stationary or rigid frame, vibrating separator, and swing-board connection, as and for the purpose set forth; fifth, in a stationary frame, vibrating separator, and swing-board connection with a rotating circular cam, as and for the purpose set forth; sixth, the combination, in a hop-picking machine, of a rigid frame, supporting the feed and the picking mechanism, and a vine or branch receptacle attached thereto; seventh, in a vine or branch receptacle, pivoted or united by a detachable hinge to the supporting-frame, as and for the purpose set forth; eighth, in the employment, in connection with the picking and the feeding mechanism, of a shield attached to the riddle underneath the former, to prevent the entanglement of the latter with hops or otherwise, as set forth; ninth, in the arrangement, in connection with the frame for supporting the feeding and picking mechanism, of hooks attached thereto, for supporting a detachable bag or hop-receiver, substantially as described.

That others may fully understand my improvements, I will particularly describe them, having reference to the accompanying drawings, wherein—

Figure 1 is a perspective view of my machine from the front. Fig. 2 is a perspective view of the same from the rear. Fig. 3 is a vertical transverse section of the operative parts of the same. Fig. 4 is a rear elevation of the same. Figs. 5, 6, 7, 8, 9 represent details and modifications.

My machine is supported upon four spreading legs, A A, or in any other proper way. The machine represented in the drawings is portable; but I do not limit myself to that quality, as it is manifest it may be so mounted as to be necessarily stationary.

The operative parts of the machine are supported by head-blocks B B, to which the supporting-legs are attached. These operative parts consist, first, of rollers for feeding the vines and other rollers for picking off the hops; and, secondly, of a separator and a receptacle for the hops.

The devices first named comprise two feed-rollers, C C, faced with some elastic material—preferably india-rubber—which are mounted in bearings in the head-blocks B B, and are geared directly together by the spur-gears $b\ b$, so that they revolve at equal speed and in opposite directions. They therefore seize and draw between them the vine and leaves whenever they are presented. In front of the rollers C C are one or more smaller fluted or grooved rollers, D D, of metal or other hard material, which, when two are used, as shown, are likewise geared directly together by the spur-wheels $d\ d$. These fluted rollers D D are revolved in a direction opposite to the revolution of the rollers C C, and are set farther apart than said rollers C C, so that, while the leaves and stalks may pass between them to the feed-rollers, the hops, which are of greater diameter, will not pass through. The rollers D D revolve in a direction opposite to the feed, and therefore the hops will merely be pulled off. The flutes or grooves assist in this operation, and make it positive. At each side there is securely bolted to the head-blocks a strong arm, E, which projects forward, with preferably a downward inclination, and the riddle F is suitably suspended from said arm by hinges or joints of some suitable kind, so that it may be freely reciprocated from side to side, swinging with the jointed suspension devices, or moved upon stationary guides, or mounted upon vibrating supports from below.

The hops which are detached by the picker-rolls fall upon the riddle F, together with such fragments of leaves, &c., as may be also detached by the rollers, and the shaking motion of the riddle causes the hops to fall through the riddle into a receptacle beneath, while the leaves, &c., will mostly work over the tail end of said riddle and fall upon the ground.

The receptacle which I prefer is a bag, G, suspended under the riddle by suitable hooks H attached to the arm E. To prevent the hops from being taken underneath the picker-rolls into the feed-rolls, and to guide them into or upon the riddle, I employ the shield-plate $g$, that may be attached either to the riddle or frame of the machine. The apron $r$, at the tail end of the riddle F, prevents the front edge of the bag from slipping outside the end of the riddle, so as to receive the leaves, &c., which pass over the tail end.

In practice I prefer to suspend the riddle F by means of interposed side boards $e$, which are attached to the arms by any suitable joints, substantially as shown.

The stiffness of the side boards $e$ is sufficient to transmit motion from one end of the riddle to the other, and enable me to apply motive power to one end only, which I could not do if the hinge-connections were separate and independent of each other.

When the bag G has become full it may be detached and replaced by an empty one, and thus the hops are less handled and exposed to injury than if received in a box or other similar receptacle.

The shake of the riddle may be effected by cranks, cams, or in any suitable way. I have shown it effected by a warped wheel, I, upon the shaft J. The edge of said wheel plays between lugs $f$ on the edge of the riddle F, and as said wheel revolves said riddle is thereby vibrated or shaken.

The driving-gear consists of a gear-wheel, K, mounted, for convenience, loosely upon the shaft J. It is supplied with a crank, treadle, or other proper means of receiving motion from the prime mover. The wheel K meshes with a pinion, L, on the end of the shaft of the lower roller C, and this shaft gears back, by wheel M and pinion N, to drive the shaft J.

It is required that the picker devices in a machine of this character shall be driven at a speed considerably higher than the speed of the feed-rolls, and this, together with the resistance encountered at the feed-rolls themselves in forcibly seizing and drawing the leaves and vines through, makes it necessary to apply considerable power to the propulsion of these devices. I therefore apply to the wheel K a double crank, having a wrist, T, for a connecting-rod, U, to transmit motion from a foot-treadle, V, and a hand-piece, W, so that the operator may use both hand and foot power, and, if necessary, two persons may co-operate in driving the machine.

At the opposite ends the rollers C C are geared together by wheels $b\ b$, so that the upper of said rollers is driven by the lower one.

At the opposite end of shaft J there is a large spur-gear, O, which meshes with and drives a pinion, P, upon the end of the upper picker-roll D, and the wheels $d\ d$ couple said rolls, so that both are driven at the same speed, but in a direction opposite the revolution of the feed-rolls C C, as hereinbefore set forth.

At the top of head-blocks B there is a connecting-frame, Q, and two stout arms, R R, bolted securely at one end. The arms project backward horizontally, and afford support for the table S, upon which the vines are placed, and from which they are fed to the rollers.

The table S is composed of a frame with a bottom of canvas or other suitable material, and I prefer, for convenience, to hinge it to one of the arms R, as shown, so that it may be turned up, as shown in Fig. 2, for the purpose of discharging the leaves, &c., which will accumulate thereon. In the drawings I have shown this table detachable for this and for shipping and portable purposes.

It is not necessary that there shall be two fluted rollers at D. One roller and a stationary edge, as shown in Fig. 8, will accomplish the purpose; or one or more ribbed rollers, such as are shown in Fig. 9, may be employed.

Having described my invention, what I claim as new is—

1. In combination with the feeding mechanism of a hop-picking machine, a fluted or ribbed picker roll or rolls, as and for the purpose set forth.

2. In a hop-picking machine provided with two feeding-rollers to draw the stalks and leaves, a picking device which is placed in front of said feeding-rollers, and acts in a direction opposite to them, combined with a reciprocating or shaking perforated or sieved separator and receptacle, also in front of the picking device, so that, as the leaves and stalks are propelled in one direction, the hops are broken off and thrown in the opposite direction upon said separator, as set forth.

3. The combination, in a hop-picking machine wherein the hops are removed at the head of the screen before the vines and leaves reach the feeding-rollers, of a fixed frame projecting from the frame which supports the picker and feeder, to support the suspended riddle or sieve and the detachable receiving-sack, as set forth.

4. The riddle or separator, combined with the rotating cam at one end of the same and the hinged side boards, whereby the separator is suspended from the fixed frame and caused to vibrate laterally uniformly at all parts when actuated at one end only.

5. The combination, in a hop-picking machine, of pickers outside and in advance of the feeding-rollers, a riddle or separator with a receptacle, also outside and in advance of the picker, combined with a vine or branch receptacle supported at the top of the frame at the side opposite the picker and separator, as shown.

6. In a hop-picking machine, a vine or branch receptacle, either pivoted or united by a detachable hinge to the supporting-frame, as and for the purpose set forth.

7. In combination with the feeding and picking mechanism, a shield, $g$, attached to the screen, and extending under said picking mechanism, to prevent entanglement of the hops with said feeding mechanism, as set forth.

8. The combination, with the frame E, projecting from the head-blocks and supporting the shaking-screen, of the depending hooks attached thereto and supporting the bag beneath the screen.

S. D. LOCKE.

Witnesses:
R. D. O. SMITH,
N. B. SMITH.